US011340732B2

(12) United States Patent
Lee et al.

(10) Patent No.: US 11,340,732 B2
(45) Date of Patent: May 24, 2022

(54) NOISE AVOIDING DEVICE AND METHOD, AND NOISE COMPENSATION DEVICE AND METHOD IN TOUCH-SENSING PANEL

(71) Applicant: Samsung Electronics Co., Ltd., Suwon-si (KR)

(72) Inventors: Jin Chui Lee, Seoul (KR); San Ho Byun, Bucheon-si (KR); Yoon Kyung Choi, Seoul (KR); Choong Hoon Lee, Seoul (KR); Bum Soo Kim, Seoul (KR); Ho Suk Na, Seongnam-si (KR); Dong Wook Lim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/587,862

(22) Filed: Sep. 30, 2019

(65) Prior Publication Data

US 2020/0272300 A1  Aug. 27, 2020

(30) Foreign Application Priority Data

Feb. 26, 2019 (KR) .................. 10-2019-0022587

(51) Int. Cl.
*G06F 3/041* (2006.01)
*G06F 3/044* (2006.01)

(52) U.S. Cl.
CPC .......... *G06F 3/04182* (2019.05); *G06F 3/044* (2013.01)

(58) Field of Classification Search
None
See application file for complete search history.

(56) References Cited

U.S. PATENT DOCUMENTS

| 8,736,573 | B2 | 5/2014 | Byun et al. |
| 8,872,789 | B2 | 10/2014 | Lee |
| 9,442,610 | B2 | 9/2016 | Joharapurkar et al. |
| 9,665,220 | B2 | 5/2017 | Park et al. |
| 2011/0193817 | A1* | 8/2011 | Byun ............... G06F 3/045 345/174 |
| 2013/0106779 | A1 | 5/2013 | Company Bosch et al. |
| 2017/0068350 | A1* | 3/2017 | Ku .................. G06F 3/04182 |
| 2017/0139536 | A1* | 5/2017 | Chen ................ G06F 3/04166 |
| 2017/0185182 | A1 | 6/2017 | Chandran et al. |
| 2018/0059818 | A1 | 3/2018 | Dinu et al. |

FOREIGN PATENT DOCUMENTS

KR       101763939 B1    8/2017

* cited by examiner

*Primary Examiner* — Brian M Butcher
(74) *Attorney, Agent, or Firm* — Harness, Dickey & Pierce, P.L.C.

(57) ABSTRACT

The present inventive concepts relate to a noise compensation device and method of a touch-sensing panel, and to a noise avoiding device and method. The noise compensation device of a touch-sensing device according to some example embodiments includes: a noise compensation signal generator configured to generate mutually different noise compensation signals for at least portions of first to Nth channels included in the touch-sensing panel; and a noise cancelling signal output circuit configured to generate noise-compensated reception signals based on the mutually different noise compensation signals and provide the noise-compensated reception signals to each of at least two channels among the first to Nth channels, wherein N is an integer two or greater.

15 Claims, 19 Drawing Sheets

NOISE AVOIDING DEVICE AND METHOD, AND NOISE COMPENSATION DEVICE AND METHOD IN TOUCH-SENSING PANEL

CROSS-REFERENCE TO RELATED APPLICATION(S)

This application claims benefit of priority to Korean Patent Application No. 10-2019-0022587 filed on Feb. 26, 2019 in the Korean Intellectual Property Office, the disclosure of which is incorporated herein by reference in its entirety.

BACKGROUND

1. Field

The present inventive concepts relate to a noise compensation device, a noise compensation method, a noise avoiding device, and a noise avoiding method for a touch-sensing panel.

2. Description of Related Art

In recent years, in accordance with advancements in display-related technology, display panels are becoming increasingly thinner.

Since the display panels in recent years influence each sensor node in panel reception ends Rx or panel transmission ends Tx to different degrees, display noise may significantly affect functions of a touch panel.

Furthermore, in cases in which the peak area of display noise occurs within a reset period of a sensing drive signal, data sampling in an amplification period may be adversely affected, causing errors in data decoding.

SUMMARY

Some example embodiments of the present inventive concepts provide a noise compensation device and method for a touch-sensing panel, which can compensate for noise drifts for each channel of the touch-sensing panel by taking into account that display noise may differently influence each channel.

Some example embodiments of the present inventive concepts provide a noise avoiding device and method for a touch-sensing panel, which can avoid a noise peak area of display noise.

According to some example embodiments of the present inventive concepts, a noise compensation device for a touch-sensing panel includes: a noise compensation signal generator configured to generate mutually different noise compensation signals for at least portions of first to Nth channels included in the touch-sensing panel; and a noise cancelling signal output circuit configured to generate noise-compensated reception signals based on the mutually different noise compensation signals, and provide the noise-compensated reception signals to each of at least two channels among the first to Nth channels, wherein N may be an integer two or greater.

According to some example embodiments of the present inventive concepts, a noise compensation method of a touch-sensing panel includes: generating mutually different noise compensation signals for at least portions of first to Nth channels included in the touch-sensing panel; generating noise-compensated reception signals based on the mutually different noise compensation signals; and providing the noise-compensated reception signals to at least two channels among the first to Nth channels, wherein N may be an integer two or greater.

According to some example embodiments of the present inventive concepts, a noise avoiding method for a touch-sensing panel may include: generating a sensing drive signal having a frequency different from a frequency of a display drive signal; setting a masking period including an interval suspected of containing a noise peak; determining whether a transition time is included in the masking period, the transition time being a time at which a state of the sensing drive signal transitions; and generating a modified sensing drive signal based on the determination, such that the transition time is not included in the masking period.

According to some example embodiments of the present inventive concepts, a noise avoiding device of a touch-sensing panel includes: an asynchronous drive signal generator configured to generate a sensing drive signal having a frequency different from a frequency of a display drive signal; a masking period setting circuit configured to set a masking period to include an interval suspect of containing a noise peak, among display noise generating intervals; and a modified asynchronous drive signal generator configured to generate a modified sensing drive signal when a transition time at which a state of the sensing drive signal transitions is included in the masking period, the modified sensing drive signal being modified such that the transition time is not included in the masking period.

BRIEF DESCRIPTION OF DRAWINGS

The above and other example embodiments of the present inventive concepts will be more clearly understood from the following detailed description, taken in conjunction with the accompanying drawings, in which.

DETAILED DESCRIPTION

Figure 1:
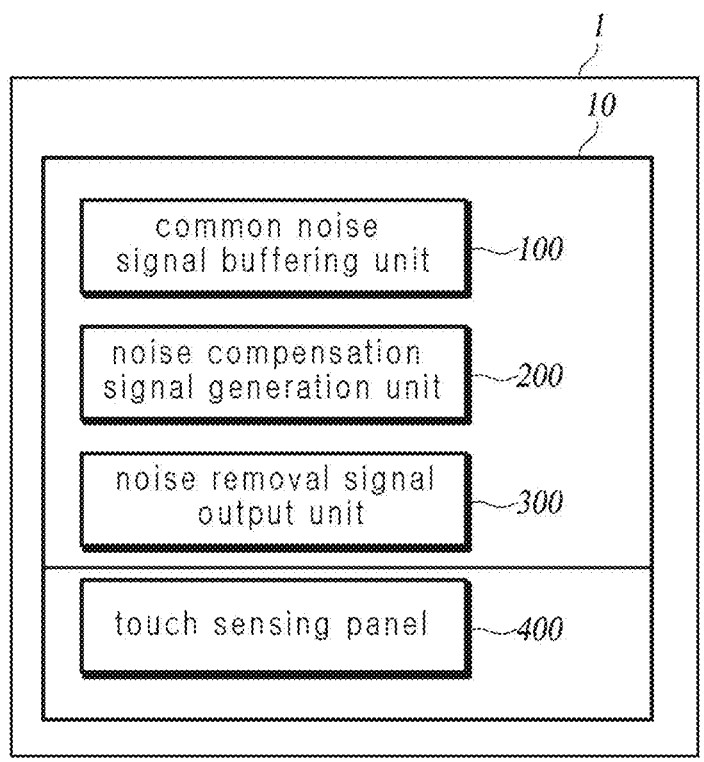
FIG. 1 is a block diagram of an electronic device including a noise compensation device of a touch-sensing panel according to some example embodiments of the present inventive concepts.

Hereinafter, some example embodiments of the present inventive concepts will be described with reference to the accompanying drawings.

Advantages and features of the present inventive concepts and methods of accomplishing the same may be understood more readily by reference to the following detailed description of some example embodiments and the accompanying drawings. The present inventive concepts may, however, be embodied in many different forms and should not be construed as being limited to the example embodiments set forth herein. Rather, these example embodiments are provided so that this disclosure will be thorough and complete and will fully convey the concepts of the present inventive concepts to those skilled in the art, and the present inventive concepts will only be defined by the appended claims. Throughout the specification, reference numerals refer to the like elements throughout.

Figure 2:
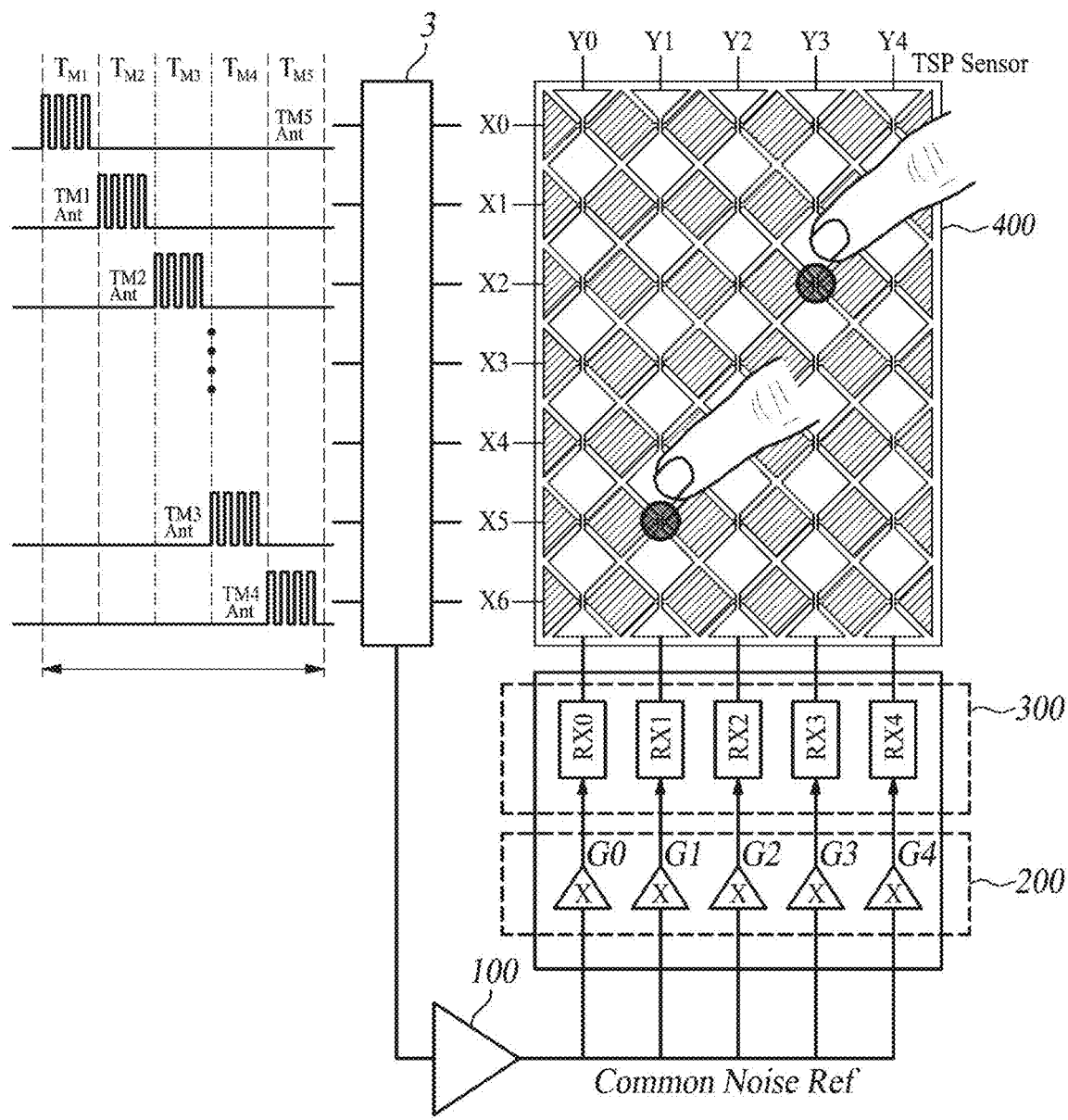
FIG. 2 is a schematic diagram illustrating a noise compensation device of a touch-sensing panel according to some example embodiments of the present inventive concepts.

FIG. 1 is a block diagram of an electronic device 1 including a noise compensation device 10 for a touch-sensing panel 400 according to some example embodiments of the present inventive concepts, and FIG. 2 is a schematic diagram illustrating a noise compensation device 10 of a touch-sensing panel 400 according to some example embodiments of the present inventive concepts. The electronic device 1 may be implemented as, for example, a personal computer (PC), a data server, an UMPC (Ultra Mobile PC), a workstation, a netbook, network-attached storage (NA), a smart television, an Internet of Things (IoT) device, and/or a portable electronic device. The portable electronic device may be implemented as, for example, a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, and/or a wearable device.

Although five channels Y0 to Y4, seven transmitting-end channels X0 to X6, five sub-noise removal signal output units RX0 to R4, five sub-noise compensation signal generation units G0 to G4, and five transmission signals TM1 to TM5 are illustrated, this number is merely for ease of explanation, and the number of channels, signal output units, sub-noise compensation signal generation units, transmission signals, and transmitting end channels in the example embodiments are not limited thereto. Hereinafter, any reference to a number of channels Y0 to Y4, signal output units RX0 to R4, compensation signal generation units G0 to G4 and/or transmission signals TM1 to TM5 should be understood to include any number of N channels, output units, compensation signal generation units, and/or transmission signals where N is an integer equal to two or greater. Hereinafter, any reference to a number of transmitting-end channels X0 to X6 should be understood to include any number of M transmitting-end channels, where M is an integer equal to two or greater.

A noise compensation device 10 of a touch-sensing panel 400 according to some example embodiments may include a common noise signal buffering unit 100, a noise compensation signal generation unit 200, and/or a noise cancelling signal output unit 300.

The touch-sensing panel 400 may be disposed on one surface of a display panel (not pictured). Due to such disposition of components, as well as the thickness reduction of display panels previously described, the touch-sensing panel 400 may be affected by display noise caused by display drive signals.

The noise compensation signal generation unit 200 may generate mutually different noise compensation signals for at least portions of first to Nth channels Y0 to Y4 included in the touch-sensing panel 400.

Conventionally, in order to remove display noise, an approximately same level of correction was applied across the entire touch-sensing panel 400. However, the influence of display noise over an entire area of the touch-sensing panel 400 may not be uniform. For example, the influence of display noise may be decreased in an area closer to an integrated circuit (IC) chip applying transmission signals to the touch sensing panel 400, and may be increased in an area far from the IC chip. In this case, if the same level of noise compensation is applied over the entire touch-sensing panel 400, areas with a relatively high influence of display noise may experience an insufficient level of noise compensation, thus causing residual noise to remain; while areas with a relatively low influence of display noise may experience overcompensation.

Accordingly, the noise compensation device 10 of a touch-sensing panel 400 may generate mutually different noise compensation signals for each of first to Nth channels Y0 to Y4 included in the touch sensing panel 400 through a noise compensation signal generation unit 200. Here, N may be an integer two or greater.

Furthermore, the noise removal signal output unit 300, by using the mutually different noise compensation signals generated by the noise compensation signal generation unit 200, may generate a noise-compensated reception signal for each channel Y0 to Y4 and provide the noise-compensated reception signal to each of at least two channels of first to Nth channels Y0 to Y4.

Meanwhile, the noise compensation device 10 of a touch-sensing panel 400 according to some example embodiments may further include a common noise signal buffering unit 100. The common noise signal buffering unit 100 may equalize a common noise signal to a uniform magnitude and provide the common noise signal to the noise compensation signal generation unit 200.

The noise compensation device 10 of a touch-sensing panel 400 according to some example embodiments will be described in greater detail with reference to FIG. 2.

FIG. 2 illustrates transmission signals TM1 to TM5 being transferred to each channel X0 to X6 of the touch-sensing panel 400 in order to detect a touch on the touch-sensing panel 400. In FIG. 2, numbers of transmitting-end channels X0 to X6 and receiving-end channels Y0 to Y4 in the touch-sensing panel 400 may be 7 and 5, respectively; however, these numbers are only for convenience of description, and the numbers of these channels may vary.

As illustrated in FIG. 2, when transmission signals are supplied from the left side of the touch-sensing panel 400 by an integrated circuit (IC) chip 3, a reception channel Y0, disposed close to the IC chip 3, among reception channels Y0 to Y4, may exhibit less influence of display noise, while a reception channel Y4, disposed far from the IC chip 3, may exhibit more influence of display noise. Accordingly, the noise compensation signal generation unit 200 of the noise compensation device 10 of the touch-sensing panel 400 may generate mutually different noise compensation signals for each of these channels Y0 to Y4.

According to some example embodiments, the noise compensation signal generation unit 200 may include first to Nth sub-noise compensation signal generation units G0 to G4 generating the noise compensation signals for each of the first to Nth channel. At least portions of the first to Nth sub-noise compensation signal generation units G0 to G4 may combine data signals with a common noise signal to generate the mutually different noise compensation signals, which will be described below with reference to FIG. 3 to FIG. 5. In order to provide the noise compensation signals generated by each of the first to Nth sub-noise compensation signal generation units G0 to G4 to each channel Y0 to Y4 of the touch-sensing panel 400, the noise removal signal output unit 300 may include first to Nth sub-noise removal signal output units RX0 to RX4.

In some example embodiments as illustrated in FIG. 2, the noise removal signal output unit 300 may generate noise-compensated reception signals based on mutually different noise compensation signals generated by the noise compensation signal generation unit 200, and provide the noise-compensated reception signals to each of channels Y0 to Y4.

The common noise signal buffering unit 100 may receive the common noise signal supplied from the IC chip 3, equalize the common noise signals to have a uniform magnitude, and provide the common noise signal having the uniform magnitude to the noise compensation signal generation unit 200. The common noise signal buffering unit 100 may be a component provided to prepare for a case in which the size of a transmission signal Tx source changes. It is preferable that the common noise signal used for generating the noise compensation signals is identical in magnitude to a noise contained in the actual noise, and when the common noise signal for generating the noise compensation signals is not identical in magnitude to a noise contained in the actual noise, a charge loss may be generated in the noise compensation signal generation unit 200. In this case, it may be difficult for the noise compensation signal generation unit 200 to generate noise compensation signals appropriately, therefore the common noise signal buffering unit 100 which equalizes the common noise signals to have a uniform magnitude may be used.

However, as long as the magnitude of the common noise signal supplied from the IC chip 3 remains unchanged, the common noise signal buffering unit 100 may not be used.

Meanwhile, the common noise signal may be provided to the noise compensation signal generation unit 200 or to the common noise signal buffering unit 100 through any one of transmitting channels X0 to X6 that do not transmit signals for a predetermined (or alternately given) time period, among the transmitting channels X0 to X6 including first to Mth channels (here, M may be an integer two or greater). For example, during a time period in which transmission signals are being applied through channel X0, channels X1 to X6 may not transmit transmission signals, and the common noise signal may be provided to the noise compensation signal generation unit 200 or the common noise signal buffering unit 100 through any one of these channels X1 to X6.

Figure 3:
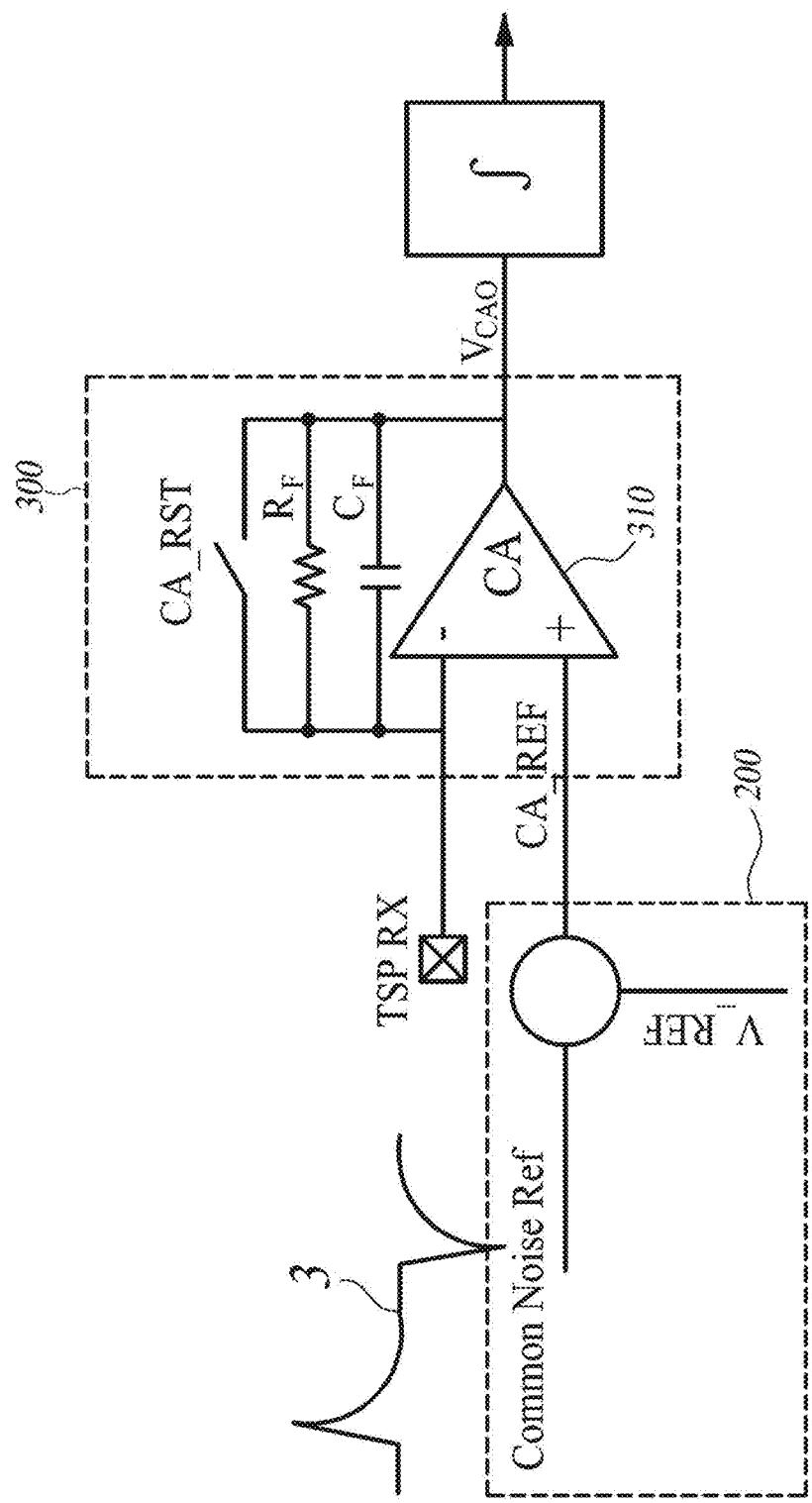
FIG. 3 is a circuit diagram illustrating a noise compensation signal generation unit and a noise cancelling signal output unit of a touch-sensing panel according to some example embodiments of the present inventive concepts.
Figure 4:
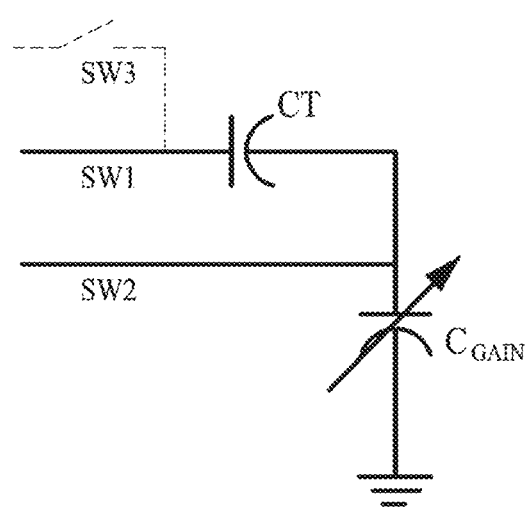
FIG. 4 is a circuit diagram illustrating an operation of receiving and storing data signals within a reset period by a noise compensation signal generation unit of a touch-sensing panel according to some example embodiments of the present inventive concepts.
Figure 5:
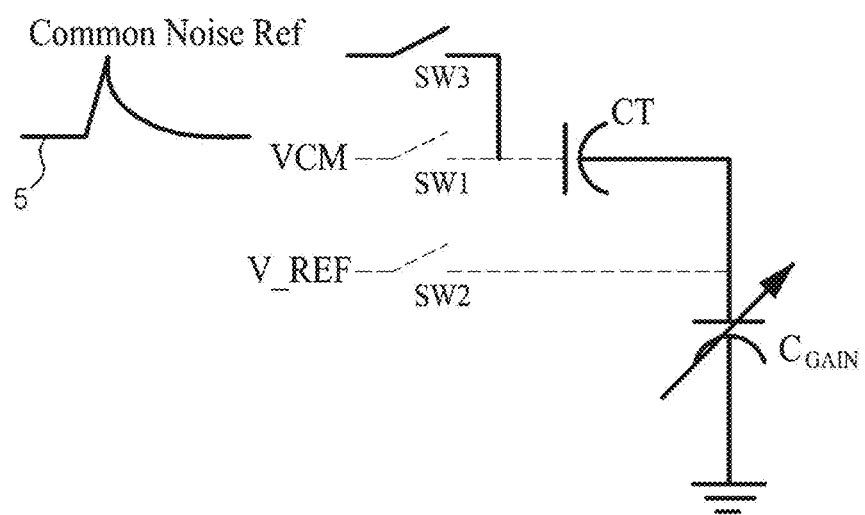
FIG. 5 is a circuit diagram illustrating an operation of combining common noise signals with data signals in an amplification period and thereby generating noise compensation signals, by a noise compensation signal generation unit of a noise compensation device of a touch-sensing panel according to some example embodiments of the present inventive concepts.
Figure 6:
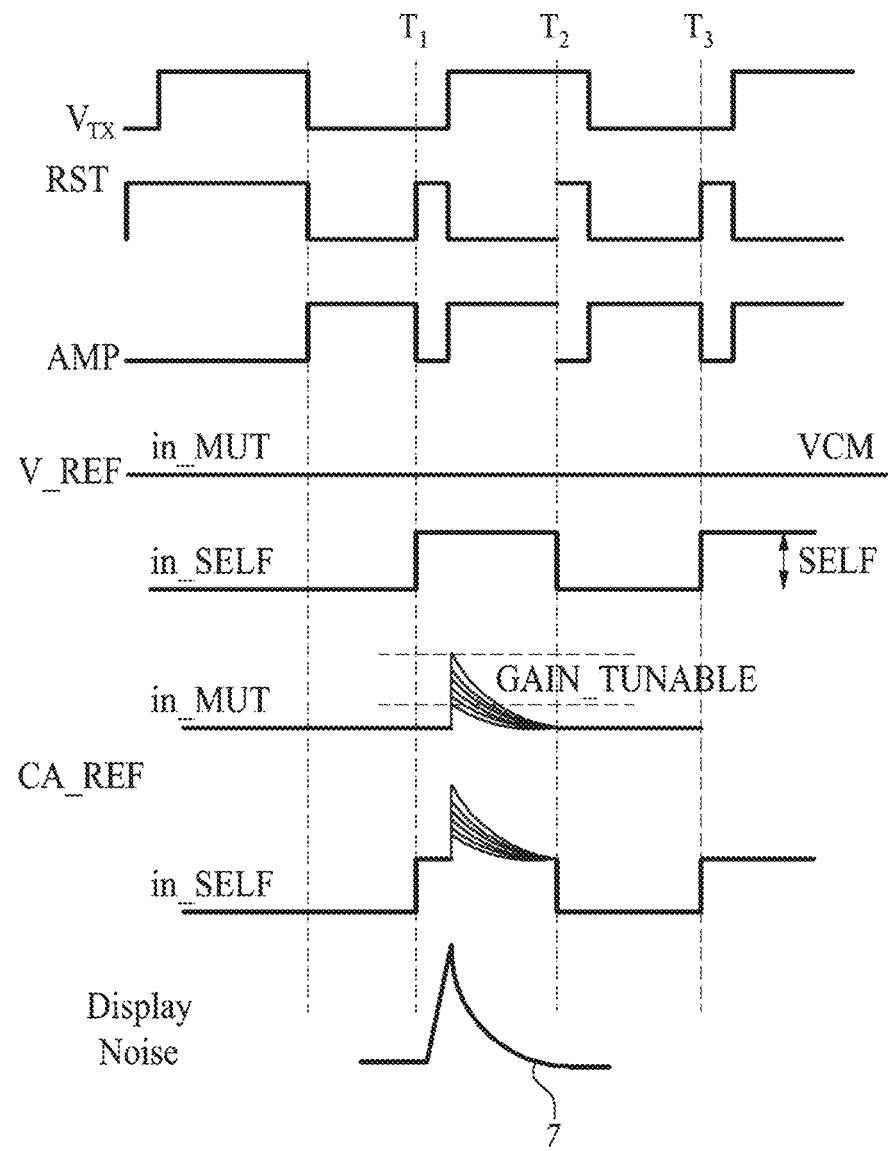
FIG. 6 illustrates various signal waveforms illustrating a mechanism of a noise compensation device of a touch-sensing panel according to some example embodiments of the present inventive concepts.

FIG. 3 is a circuit diagram illustrating some example embodiments of the noise compensation signal generation unit 200 and the noise cancelling signal output unit 300 of the noise compensation device 10 of a touch-sensing panel 400 according to some example embodiments of the present inventive concepts. FIG. 4 is a circuit diagram illustrating an operation of receiving and storing data signals within a reset period by the noise compensation signal generation unit 200 of the noise compensation device 10 of a touch-sensing panel 400 according to some example embodiments of the present inventive concepts. FIG. 5 is a circuit diagram illustrating operations of combining common noise signals with data signals to generate noise compensation signals within an amplification period by the noise compensation signal generation unit 200 of the noise compensation device 10 of a touch-sensing panel 400 according to some example embodiments of the present inventive concepts. FIG. 6 illustrates various signal waveforms illustrating operation principles of a noise compensation device 10 of a touch-sensing panel 400 according to some example embodiments of the present inventive concepts.

Referring to FIG. 3, the noise compensation signal generation unit 200 may generate a noise compensation signal CA_REF by combining a common noise signal Common Noise Ref with a data signal V_REF. Here, the component denoted by 200 in FIG. 3, may refer to one of first to Nth sub-noise compensation signal generation units G0 to G4, and the first to Nth sub-noise compensation signal generation units G0 to G4 may generate the noise compensation signals for the first to Nth channels Y0 to Y4, respectively. In order to generate mutually different noise compensation signals for each of a plurality of channels Y0 to Y4, the noise compensation signal generation unit 200 may include a plurality of sub-noise compensation signal generation units G0 to G4.

Referring to FIG. 4 and FIG. 5, a method by which a sub-noise compensation signal generation unit G0 to G4 generates a noise compensation signal to be applied to a specific channel will be described.

Meanwhile, a drive signal of a touch-sensing panel 400 may include a single reset period and a single amplification period for each interval in which a signal transition occurs. The drive signal of a touch-sensing panel 400 may include the reset period as such for the purposes of improving the order of an analog filter through a reset operation and reducing or preventing the saturation by performing the reset before a previous stage of an analog circuit becomes saturated, thereby.

Since the touch-sensing panel 400 performs reset and amplification operations every time a drive signal transitions, a noise compensation signal generated in order to compensate for noise appearing on the touch-sensing panel 400 may be provided to the touch-sensing panel 400 in accordance with the cycle of a drive signal of the touch-sensing panel 400. In other words, noise compensation signals generated by the noise compensation signal generation unit 200 may also include the reset period and the amplification period.

The first to Nth sub-noise compensation signal generation units G0 to G4, during the reset period, may receive and store data signals, and within the amplification period, may receive the common noise signals and combine the same with the data signals to generate the noise compensation signals.

FIG. 4 illustrates a circuit configuration implemented within a reset period. Referring to FIG. 4, within the reset period, a first switch SW1 and a second switch SW2 may be turned on and a third switch SW3 may be turned off to receive data signals. The data signals may be temporarily stored in a capacitor CT (Cgain) that exists in a sub-noise compensation signal generation unit G0 to G4. FIG. 5 illustrates a circuit configuration implemented within an amplification period, referring to FIG. 5, within the amplification period, a first switch SW1 and a second switch SW2 may be turned off and a third switch SW3 may be turned on.

The noise compensation signal CA_REF formed by a sub-noise compensation signal generation unit G0 to G4 operating within the reset period and the amplification period, as illustrated in FIG. 4 and FIG. 5, respectively, may have CA_REF waveforms illustrated in FIG. 6. FIG. 6 illustrates in_MUT and in_SELF waveforms as data signals V_REF provided to a sub-noise compensation signal generation unit G0 to G4, and each of these data signals may be combined with a common noise signal having a magnitude adjusted by the sub-noise compensation signal generation unit G0 to G4, thereby forming the CA_REF waveforms illustrated in FIG. 6.

As illustrated in FIG. 6, in these CA_REF waveforms, the common noise signal combined with the data signal (in_MUT or in_SELF) may be designed to be magnitude-adjustable (gain-tunable). Referring to FIG. 4 and FIG. 5, each sub-noise compensation signal generation unit G0 to G4 includes a variable capacitor Cgain, and the magnitude of the common noise signal to be combined with the data signal may be determined by adjusting the capacitance value of the variable capacitor Cgain.

Accordingly, each sub-noise compensation signal generation unit G0 to G4 may generate mutually different noise compensation signals for each channel Y0 to Y4 included in the touch-sensing panel 400 by using common noise signals adjusted to have different magnitudes based on the position of each channel Y0 to Y4.

Referring to FIG. 3, the noise compensation signals generated for each channel Y0 to Y4 may be subjected to a comparison with reception signals TSP RX of the touch-sensing panel 400 by each sub-noise removal signal output unit RX0 to RX4, and a noise-compensated reception signal based on a result of the comparison may be outputted. In some example embodiments, the sub-noise cancelling signal output unit 300 may include a comparator 310.

Consequently, the noise compensation device 10 for a touch-sensing panel 400 according to some example embodiments of the present inventive concepts may compensate for noise drifts for each of a plurality of channels Y0 to Y4 included in the touch-sensing panel 400 by taking into account that display noise may influence each channel Y0 to Y4 to a different degree.

Figure 7:
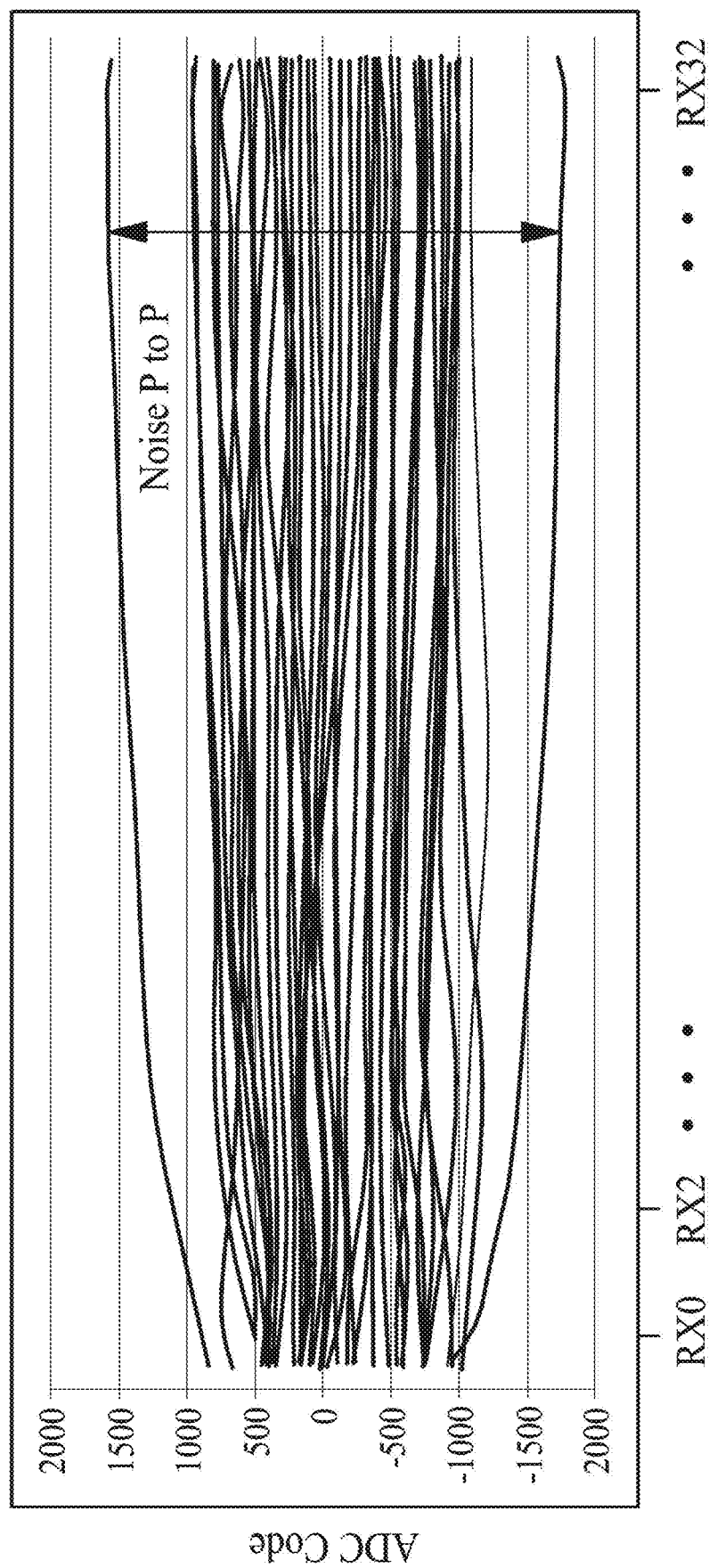
FIG. 7 is a graph illustrating a noise that appears in SELF reception data waveforms when a noise compensation device of a touch-sensing panel according to some example embodiments of the present inventive concepts is not applied.
Figure 8:
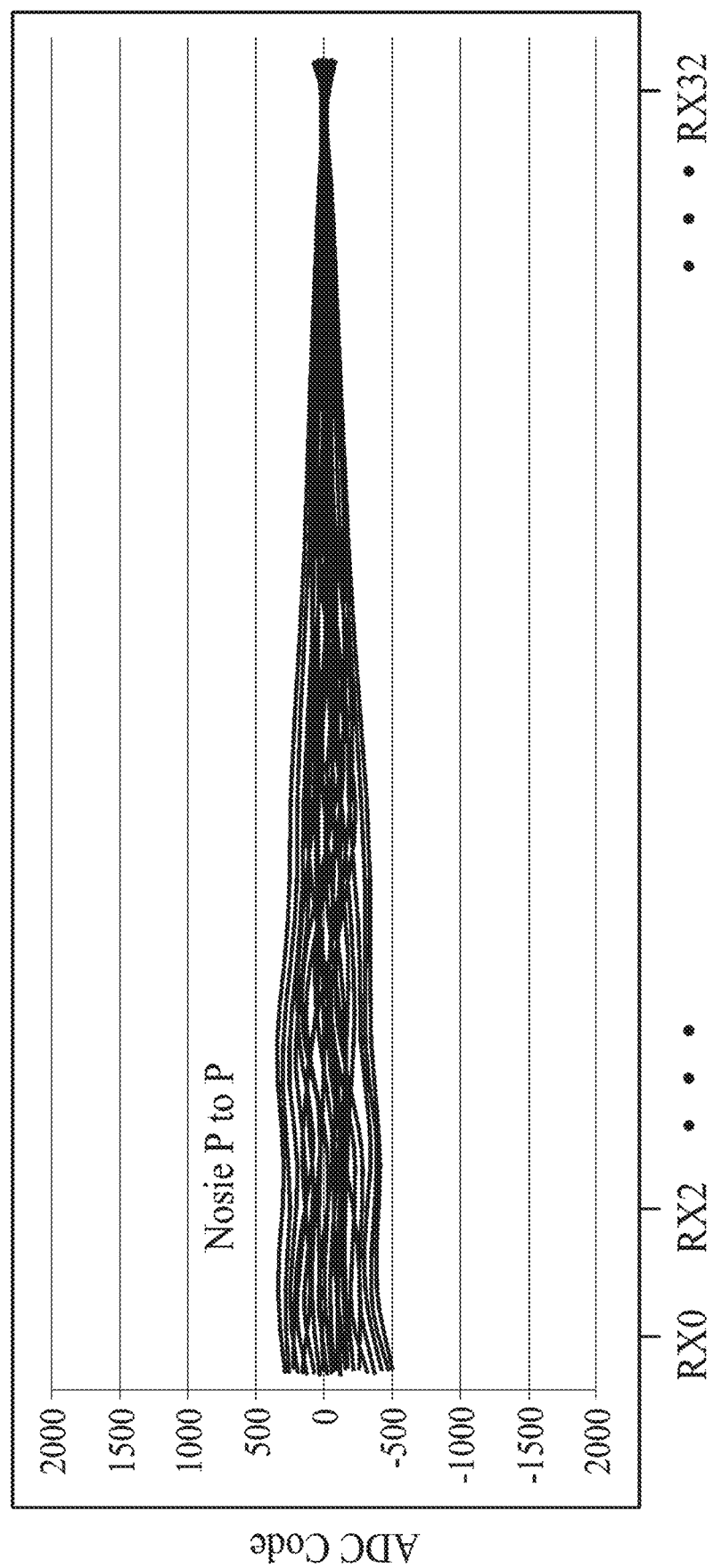
FIG. 8 is a graph illustrating a noise that appears in SELF reception data waveforms when a noise compensation device of a touch-sensing panel according to some example embodiments of the present inventive concepts is applied.
Figure 9:
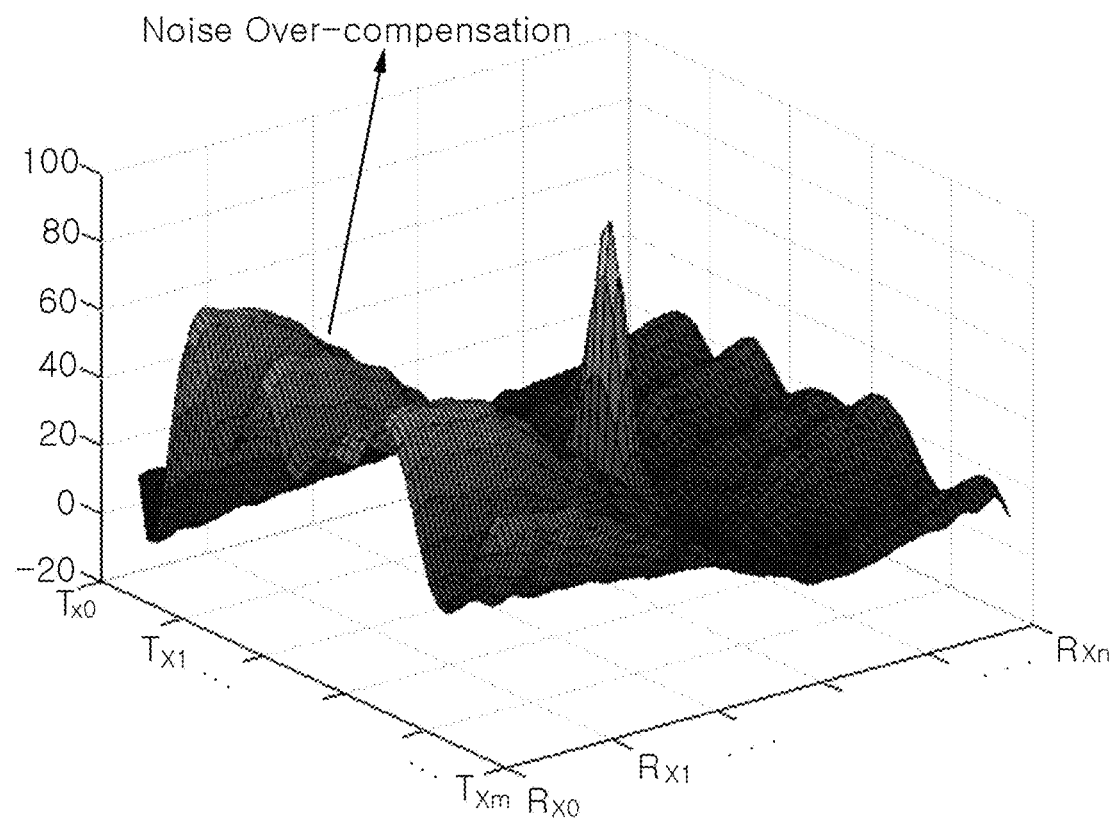
FIG. 9 is a 3D profile illustrating a display noise pattern that appears when a noise compensation device of a touch-sensing panel according to some example embodiments of the present inventive concepts is not applied.
Figure 10:
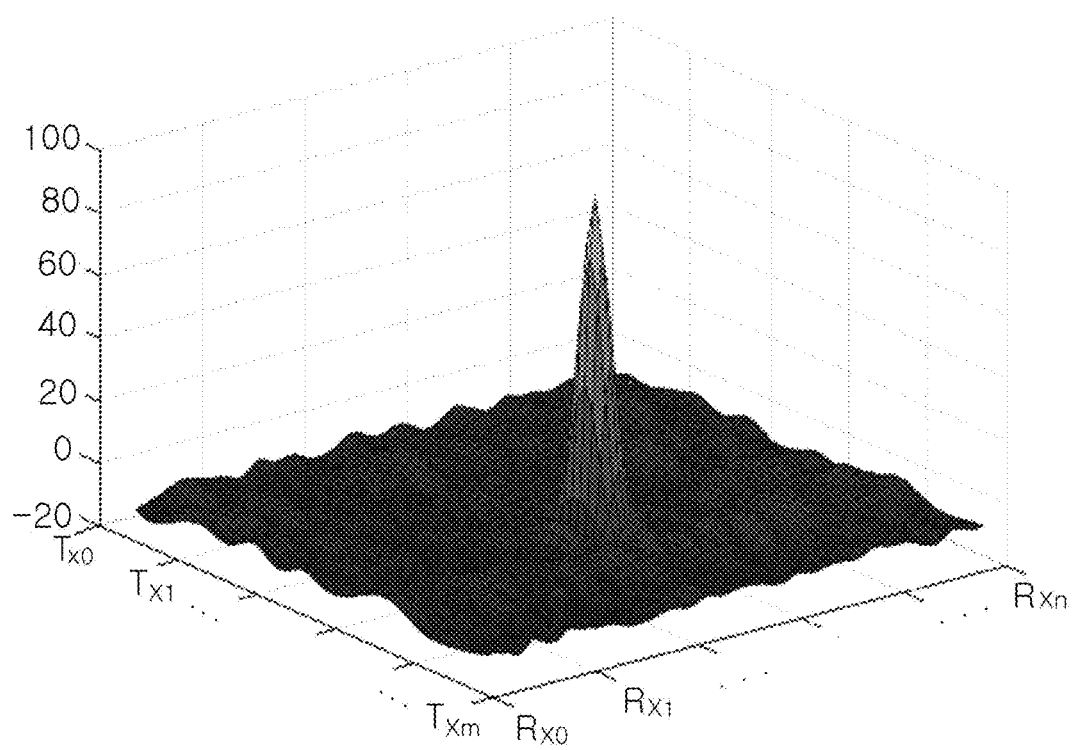
FIG. 10 is a 3D profile illustrating a display noise pattern that appears when a noise compensation device of a touch-sensing panel according to some example embodiments of the present inventive concepts is applied.

FIG. 7 is a graph illustrating a noise that appears in SELF reception data waveform when the noise compensation device 10 for a touch-sensing panel 400 according to some example embodiments of the present inventive concepts is not applied, and FIG. 8 is a graph illustrating a noise that appears in SELF reception data waveform when the noise compensation device 10 for a touch-sensing panel 400 according to some example embodiments of the present inventive concepts is applied. FIG. 9 is a 3D-profile illustrating a display noise pattern when the noise compensation device 10 for a touch-sensing panel 400 according to some example embodiments of the present inventive concepts is not applied. FIG. 10 is a 3D-profile illustrating a display noise pattern when the noise compensation device 10 for a touch-sensing panel 400 according to some example embodiments of the present inventive concepts is applied.

Referring to FIG. 7 and FIG. 8, it could be confirmed that, when noise compensation is performed to the same level over the entire touch-sensing panel 400 as in a conventional scheme, the amplitude of noise that appears in a SELF reception data waveform may be significantly broad, whereas when the noise compensation device 10 for a touch-sensing panel 400 according to some example embodiments of the present inventive concepts was applied, the amplitude of noise that appears in a SELF reception data waveform was significantly reduced.

As can be seen from FIG. 9, when noise compensation is to be performed to the same level over the entire touch-sensing panel 400 as in a conventional scheme, a noise pattern that appears upon application of MUT data signals may show that there are some channels where the noise is over-compensated, while there are other channels across the over-compensated channels where noise compensation is insufficiently performed. Meanwhile, when the noise compensation device 10 for a touch-sensing panel 400 according to some example embodiments of the present inventive concepts is applied, as can be seen from FIG. 10, the noise may be significantly reduced over the entire touch-sensing panel 400.

Figure 11:
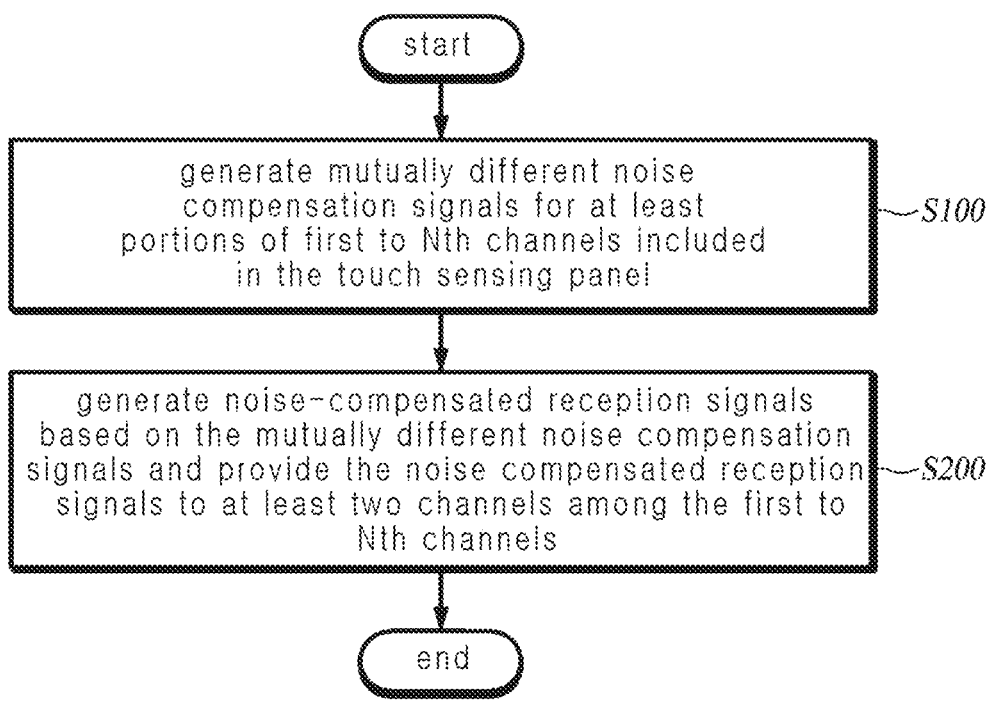
FIG. 11 is a flowchart illustrating a noise compensation method of a touch-sensing panel according to some example embodiments of the present inventive concepts.
Figure 12:
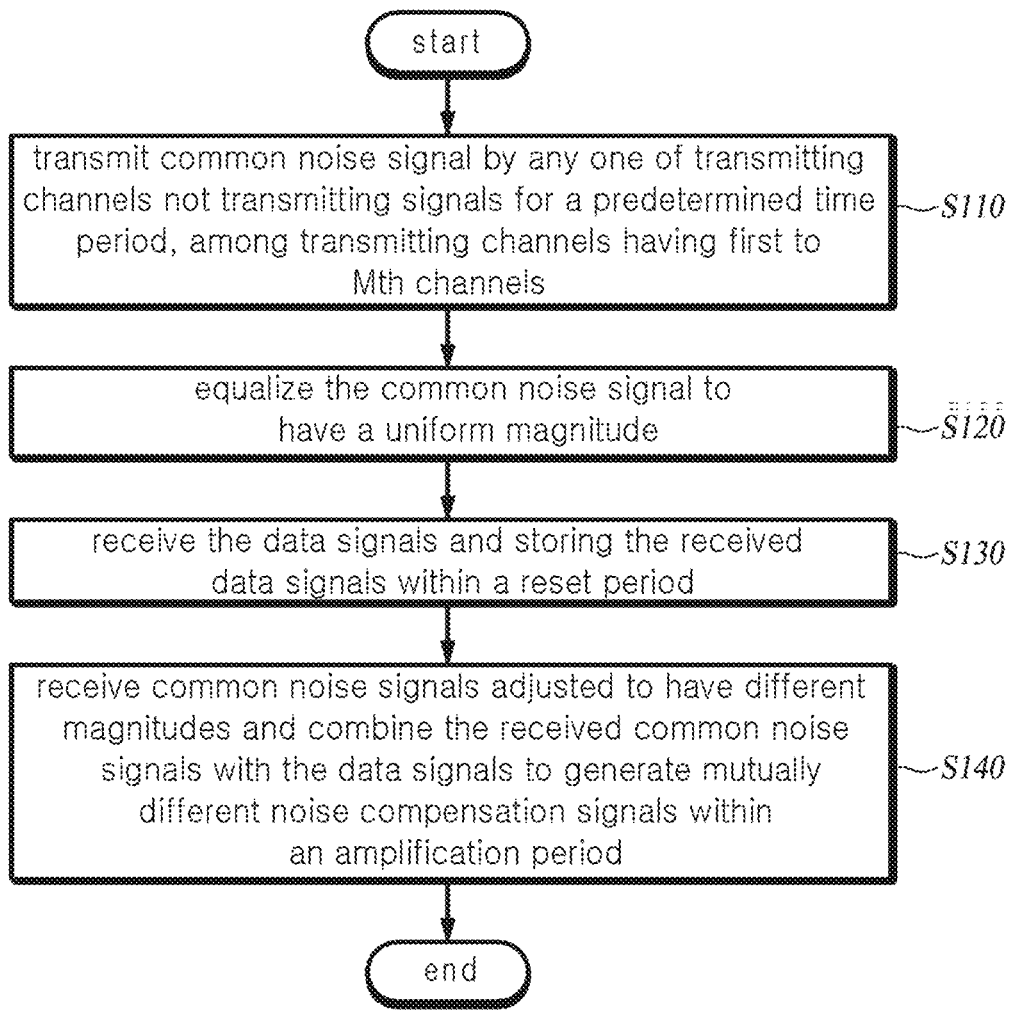
FIG. 12 is a flowchart illustrating operation S100 in FIG. 11 according to some example embodiments of the present inventive concepts.

FIG. 11 is a flowchart illustrating a noise compensation method for a touch-sensing panel 10 according to some example embodiments of the present inventive concepts, and FIG. 12 is a flowchart illustrating operation S100 in FIG. 11 according to some example embodiments.

A noise compensation method for a touch-sensing panel 400 according to some example embodiments may include an operation S100 of generating mutually different noise compensation signals for at least portions of first to Nth channels Y0 to Y4 included in the touch sensing panel 400;

and an operation S200 of generating noise-compensated reception signals based on the mutually different noise compensation signals and providing the noise compensated reception signals to at least two channels among the first to Nth channels Y0 to Y4. Here, N may be an integer two or greater.

For example, the operation S100 may include an operation S110 of transmitting common noise signals through any one of transmitting channels X0 to X6 not transmitting signals for a predetermined (or alternately given) time period, among transmitting channels X0 to X6 having first to Mth channels; an operation S120 of equalizing the common noise signal to have a uniform magnitude; an operation S130 of receiving the data signals and storing the received data signals within a reset period; and an operation S140 of receiving common noise signals adjusted to have different magnitude and combining the received common noise signals with the data signals to generate mutually different noise compensation signals, within an amplification period.

The noise compensation method for a touch-sensing panel 400 according to some example embodiments of the present inventive concepts may be better understood by referring to the description of the noise compensation device 10 of a touch-sensing panel 400, previously described in the specification with reference to FIG. 1 through FIG. 10. For example, the operation S120 may correspond to a function performed by the common noise signal buffering unit 100 of the noise compensation device 10 of a touch-sensing panel 400, the operations S130 and S140 may correspond to a function performed by the noise compensation signal generation unit 200, and the operation S200 may correspond to a function performed by the noise-removing signal output unit 300. Hence, in order to avoid repetitive description, the noise compensation method for a touch-sensing panel 400 according to some example embodiments of the present inventive concepts will not be described here.

Meanwhile, as illustrated in FIG. 6, a display noise 7 may tend to peak at the onset of the occurrence, and then gradually decreases in its size. Furthermore, the display noise 7 may have the same frequency as a drive signal of a display panel.

Meanwhile, as described above, the drive signal of the touch-sensing panel 400 may include one reset period and one amplification period for every time period in which a signal transition occurs. However, when the display noise 7 is shown to peak (hereinbelow referred to as peak timing for convenience) within the reset period, data sampling in the amplification period may be affected, causing an error when decoding data. Accordingly, it is necessary that the peak timing of the display noise 7 may not be included in the reset period of the drive signal of the touch-sensing panel 400.

To address the issue described above, there may be a control scheme whereby the peak timing of the display noise 7 is not included in the reset period while being in sync with the drive signal of the display panel. Such a control scheme, however, requires that the frequency of the drive signal of the touch-sensing panel 400 is identical to the frequency of the drive signal of the display panel. Thus, the frequency of the drive signal of the touch-sensing panel 400 is unable to change as needed, and furthermore, an external noise having a corresponding frequency, if introduced, cannot be avoided.

To address such technical issues, the present inventive concepts may provide a noise avoiding device 60 for a touch-sensing panel 400 and a noise avoiding method, whereby a noise peak area of display noise may be avoided by shifting the waveform of the touch sensing drive signal while applying a touch-sensing drive signal having a frequency different from a display noise generating frequency.

Figure 13:
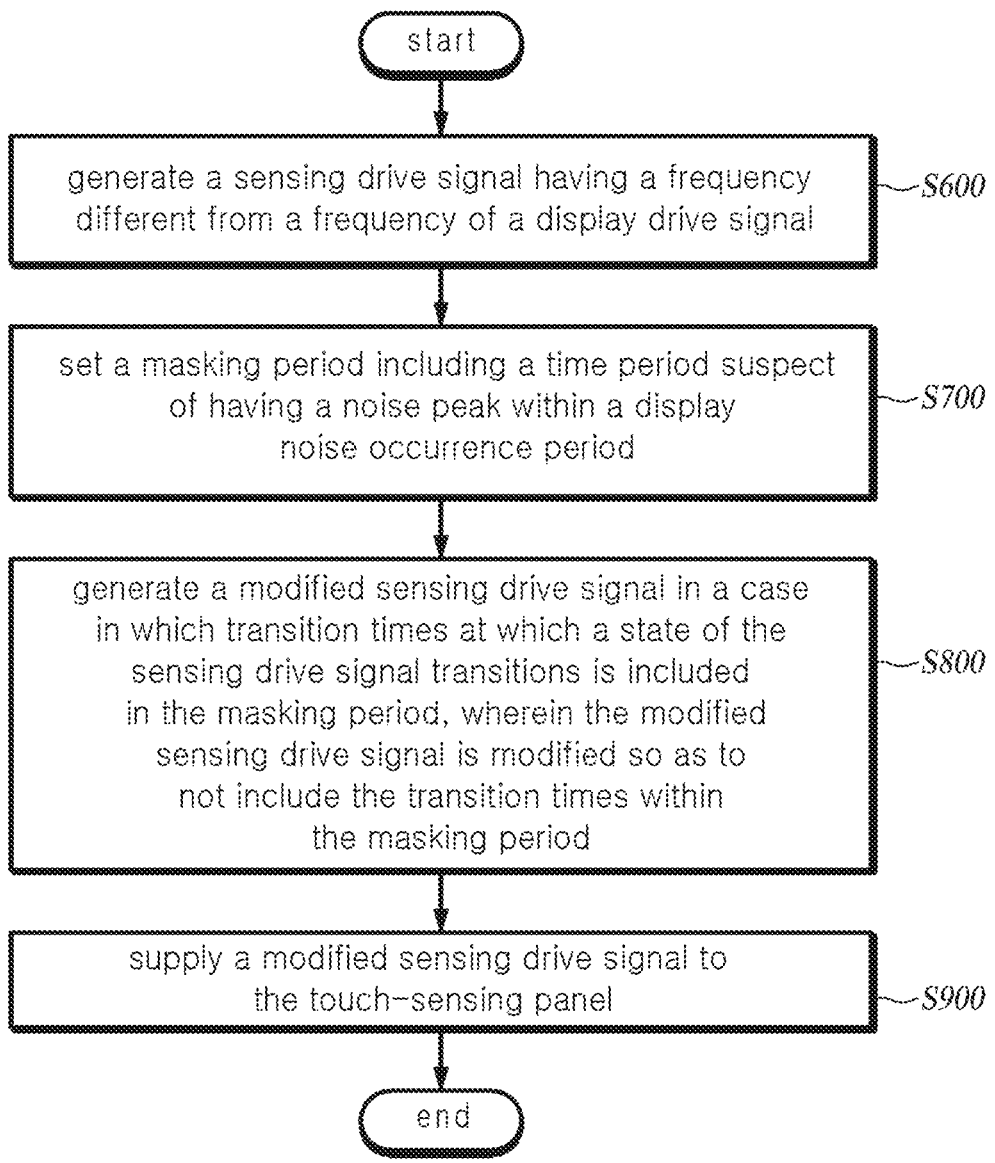
FIG. 13 is a flowchart illustrating a noise avoiding method of a touch-sensing panel according to some example embodiments of the present inventive concepts.
Figure 14:
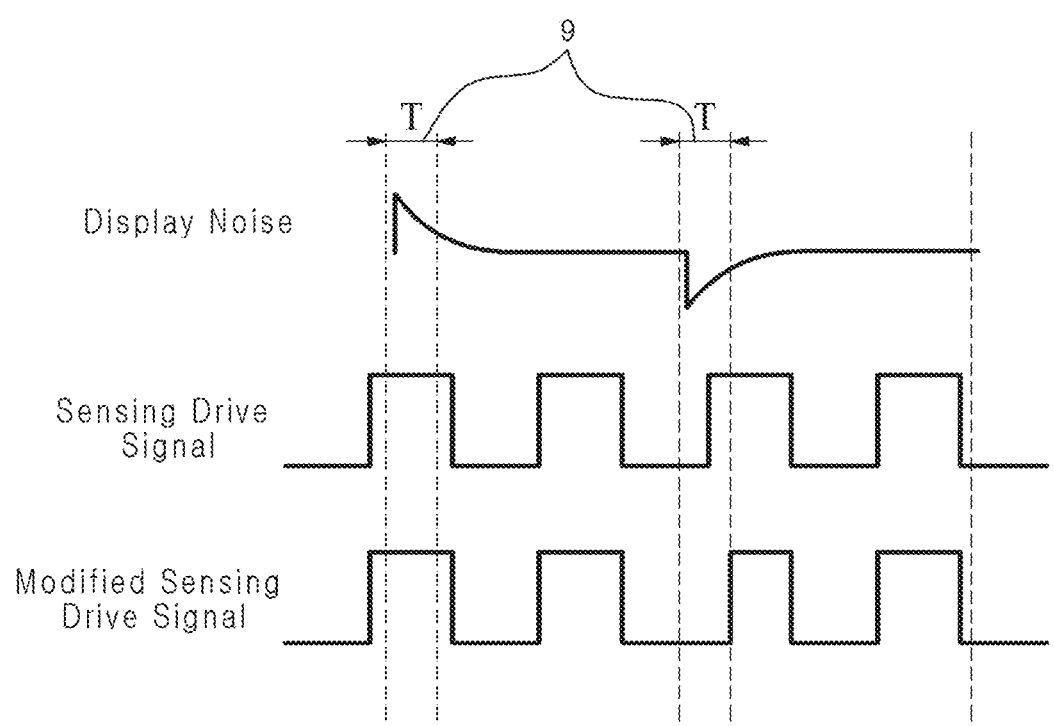
FIG. 14 is a signal waveform diagram illustrating a noise avoiding method of a touch-sensing panel according to some example embodiments of the present inventive concepts.
Figure 15:
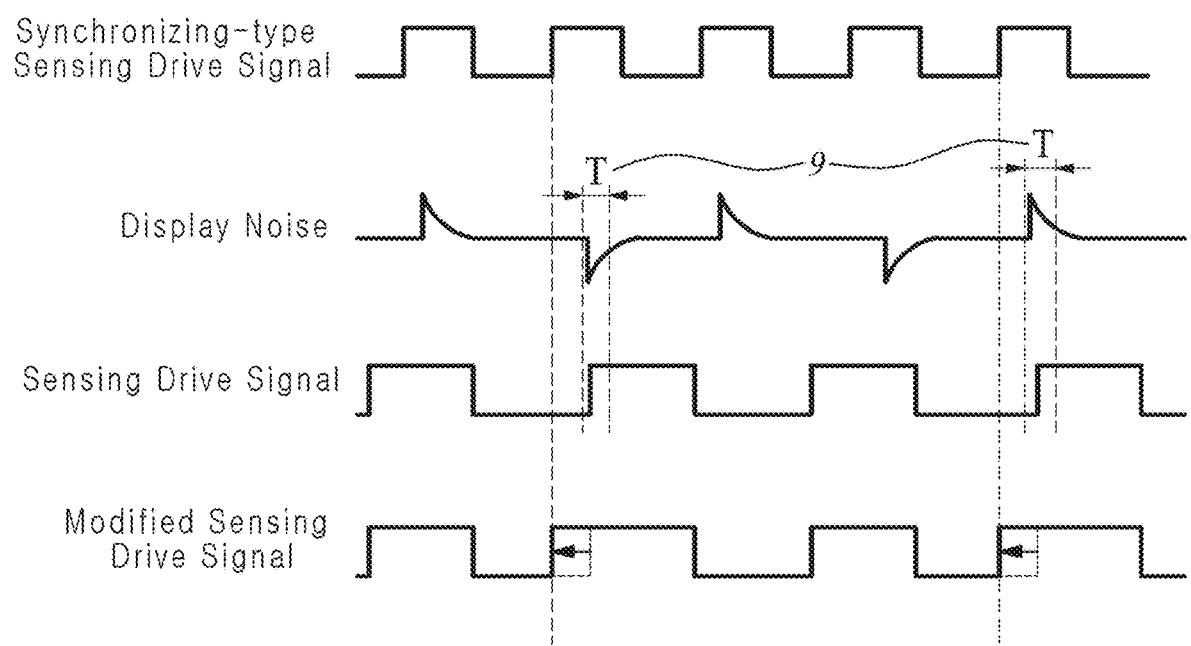
FIG. 15 is a signal waveform diagram illustrating a noise avoiding method of a touch-sensing panel according to some example embodiments of the present inventive concepts.

FIG. 13 is a flowchart illustrating a noise avoiding method of a touch-sensing panel 400 according to some example embodiments of the present inventive concepts, FIG. 14 is a signal waveform diagram illustrating a noise avoiding method of a touch-sensing panel 400 according to some example embodiments of the present inventive concepts, and FIG. 15 is a signal waveform diagram illustrating a noise avoiding method of a touch-sensing panel 400 according to some example embodiments of the present inventive concepts.

The noise avoiding method for a touch-sensing panel 400 according to some example embodiments may include an operation S600 of generating a sensing drive signal having a frequency different from a frequency of a display drive signal, an operation S700 of setting a masking period including a time period suspect of having a noise peak within a display noise occurrence period; and an operation S800 of generating a modified sensing drive signal in a case in which transition times at which a state of the sensing drive signal transitions is included in the masking period, wherein the modified sensing drive signal is modified so as to not include the transition times within the masking period. Operations S600 and S700 may be safely carried out in a reverse order, and it should be considered that such an example embodiment is within the scope of the present inventive concepts.

Furthermore, a noise avoiding method in a touch-sensing panel 400 according to some example embodiments may further include an operation S900 of supplying a modified sensing drive signal to the touch-sensing panel 400.

Among the three waveforms illustrated in FIG. 14, the waveform illustrated on top is a display noise, which is being generated having a predetermined (or alternately given) cycle while showing a peak form. As a method of avoiding an influence of display noise, as described above, the present inventive concepts apply a touch sensing drive signal having a frequency different from a frequency of a display noise. The second waveform illustrated in FIG. 14 is a sensing drive signal according to some example embodiments, which has a frequency different from a display noise generating frequency.

As described above, when the frequency of the display noise is different from the frequency of the sensing drive signal, there may arise a situation where a peak timing of the display noise may be included in the reset period of the sensing drive signal. For example, if the reset period of the sensing drive signal exists adjacent to a time at which the sensing drive signal inverts, there may arise a situation where, as can be seen in the first noise occurred in the display noise waveform illustrated in FIG. 14, the peak timing is included in the amplification period of the sensing drive signal and yet does not overlap with the reset period; or alternatively, there may arise a situation where, as can be seen in the second noise occurred in the display noise waveform illustrated in FIG. 14, the peak timing may overlap with the reset period of the sensing drive signal.

Since a touch-sensing operation samples the final value of the amplification period, data decoding suffers no issue even when the peak timing is formed within the amplification period of a sensing drive signal, which is the case for the first noise occurred in the display noise waveform illustrated in FIG. 14, for example. However, when the peak timing of display noise is included in a reset period of the sensing drive signal, data sampling is adversely affected. Therefore, it is necessary that the peak timing of the noise is not included in the reset period of the sensing drive signal.

According to some example embodiments of the present inventive concepts, first, in operation S700, a masking period may be set so as to include an interval suspect of containing a noise peak among display noise occurring intervals. The interval suspect of containing a noise peak may be defined using signals provided from a display driver integrated chip (DDI). Based on these signals provided from the DDI, having a regularity, it is possible to predict the times at which a noise would occur.

Meanwhile, the masking period is illustrated as interval T in FIG. 14, and the length of this masking period may be predetermined (or alternately given) by considering the probability of the noise peak being included in the masking period and the size of harmonic components of a transfer function.

Next, in operation S800, if transition times at which a state of the sensing drive signal transitions are included in the masking period, the transition times may be modified such that those transition times are not included in the masking period, thereby generating a modified sensing drive signal.

Referring to FIG. 14, the modified sensing drive signal illustrated on the bottom of FIG. 14 has portions of waveform modified with respect to the sensing drive signal before modification. More specifically, in the case where the transition timing at which a state of the sensing drive signal transitions is included within the masking period, the sensing drive signal may be modified such that the transition timing at which the state of the sensing drive signal transitions is not included in the masking period.

Although FIG. 14 only illustrates some example embodiments in which a transition time at which the state of a sensing drive signal transitions is moved to a later time to avoid a masking period, it should be understood that example embodiments in which the transition time is moved to an earlier time to avoid the masking period, allowing the masking period of display noise and the reset period of a modified sensing drive signal to avoid overlapping each other, are also included in the scope of the present inventive concepts. In other words, the transition time may be positioned on any one of two boundaries defining the masking period.

As example embodiments in which the transition time is modified, the transition time may be modified on the basis of a transition time of a waveform having a frequency identical to that of the display drive signal. As previously described, there exists a scheme in which a touch-sensing panel drive signal with a synchronous frequency identical to that of a drive signal of the display panel is applied to avoid display noise. The present example embodiment involves application of synchronous panel drive signals while being based on nonsynchronous touch-sensing panel drive signals as described for the other example embodiments.

Referring to the first and second waveforms in FIG. 15, the scheme of applying synchronizing-type sensing drive signals may be designed such that the peak timing of display noise avoids a reset period of a sensing drive signal by synchronizing with a display noise generating frequency. In some example embodiments, while applying a sensing drive signal different from a display noise generating frequency as illustrated in the third waveform in FIG. 15, if the peak timing of display noise overlaps with the reset period of a sensing drive signal, the transition time of the sensing drive signal can be modified to a transition time in a case in which synchronizing-type sensing drive signals are applied, as illustrated in the fourth waveform in FIG. 15.

Modified sensing drive signals generated according to some example embodiments illustrated in FIG. 14 and FIG. 15, for example, are transferred to the touch-sensing panel 400 in operation S900, and as the touch-sensing panel 400 is driven, influences due to display noise peak may be reduced or eliminated.

Figure 16:
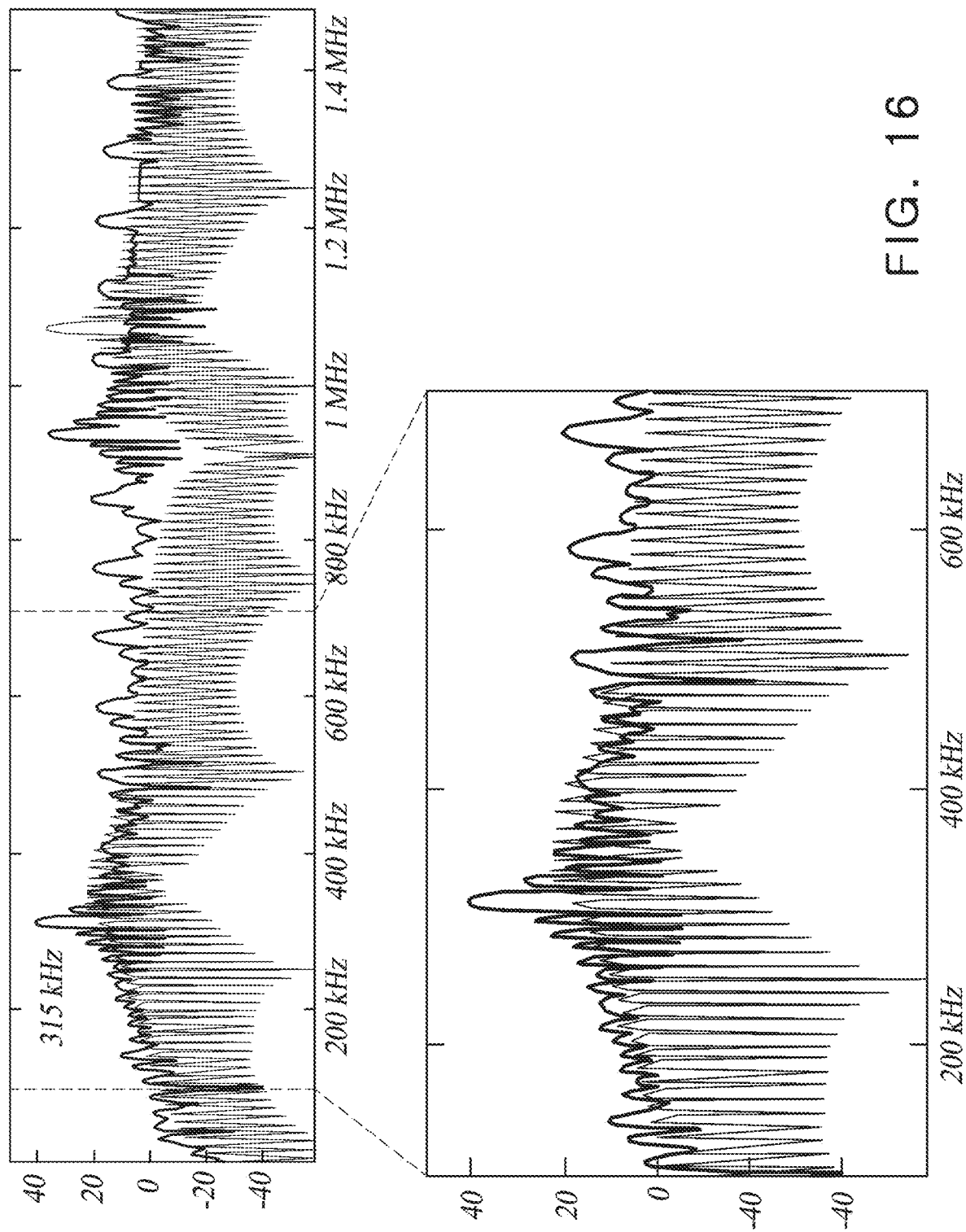
FIG. 16 is a graph illustrating a transfer function of a sensing drive signal in a noise avoiding method of a touch-sensing panel according to some example embodiments of the present inventive concepts.
Figure 17:
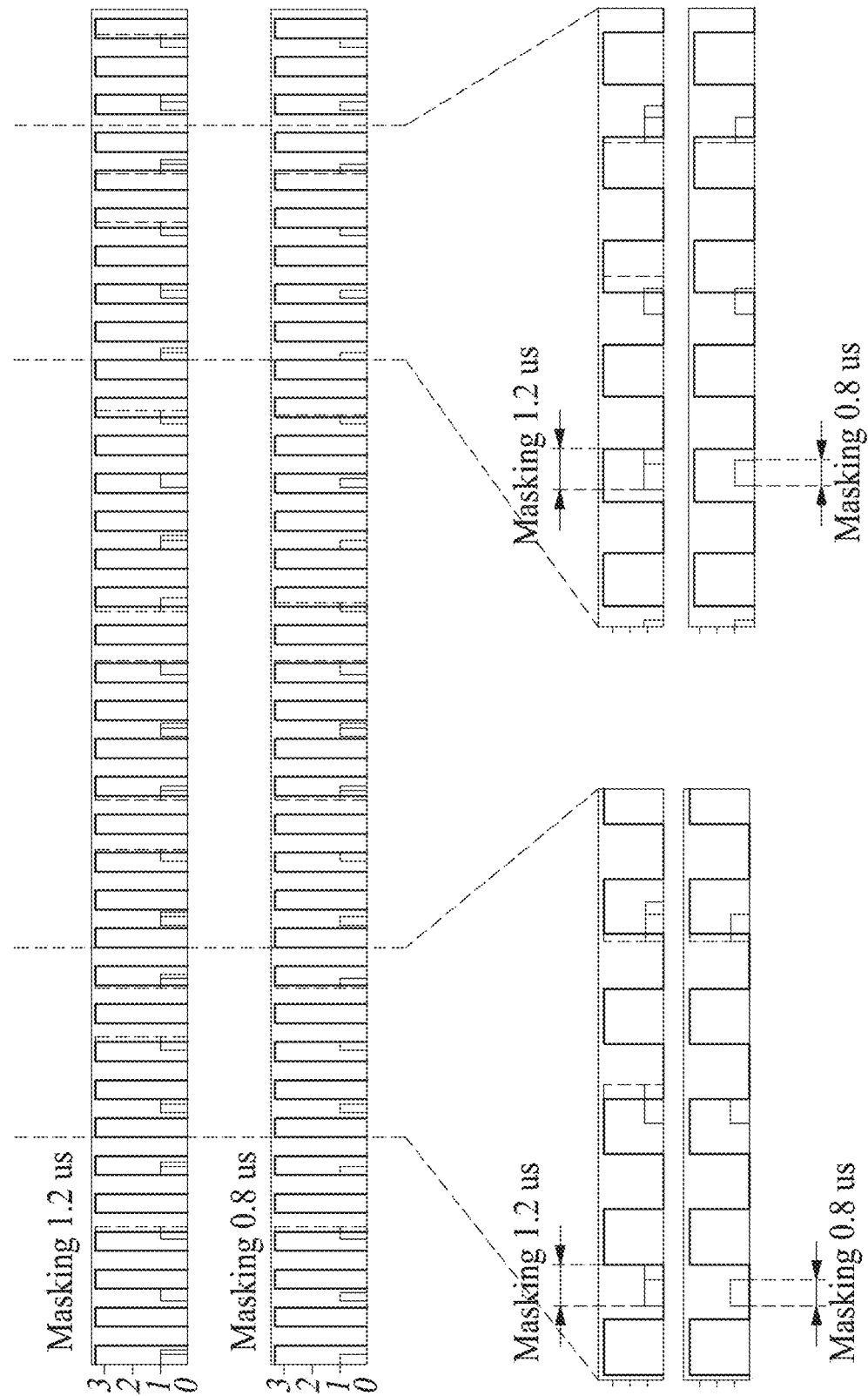
FIG. 17 is a signal waveform diagram illustrating changes in sensing drive signal waveforms according to two kinds of masking areas set at different values from each other according to some example embodiments of the present inventive concepts.
Figure 18:
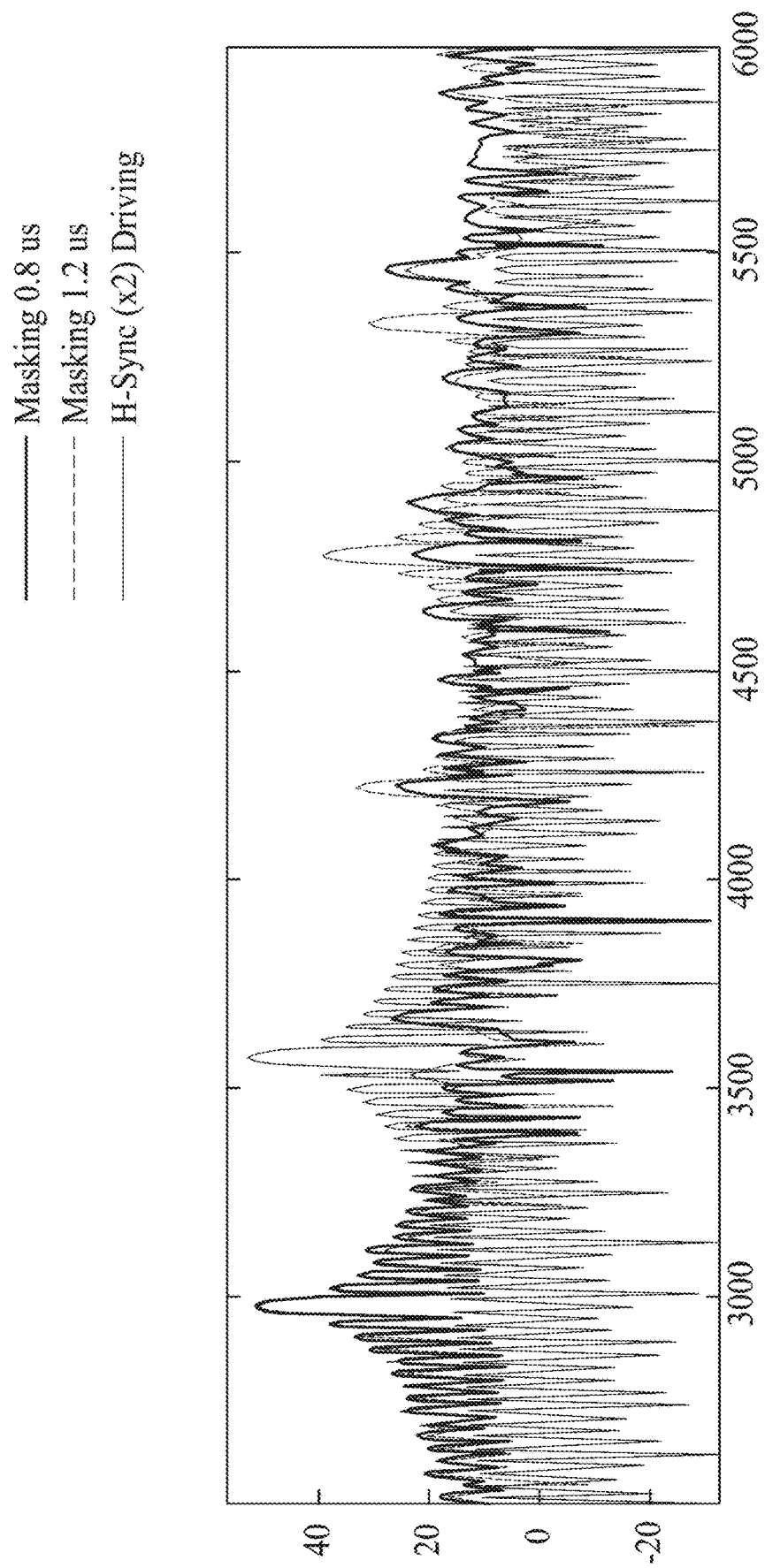
FIG. 18 is a graph illustrating a transfer function of a sensing drive signal according to two kinds of masking areas set at different values from each other according to some example embodiments of the present inventive concepts.

FIG. 16 is a graph illustrating a transfer function of a sensing drive signal in a noise avoiding method for a touch-sensing panel 400 according to some example embodiments; FIG. 17 is a signal waveform diagram illustrating changes in waveform of a sensing drive signal according to two masking periods set at different values according to some example embodiments; and FIG. 18 is a graph illustrating a transfer function of a sensing drive signal according to two masking periods set at different values according to some example embodiments.

Referring to FIG. 16, a mean frequency of modified sensing drive signal applied in some example embodiments of the present inventive concepts may be 315 KHz, which differs from the frequency of synchronizing drive signal, 360 KHz.

FIG. 17 illustrates modified sensing drive signals when a masking period may be set at 1.2 us, and at 0.8 us, respectively. As seen in FIG. 17, when the masking period is set relatively broad, changes in waveform of a sensing drive signal may occur more frequently than when it is not.

However, when the masking period is set relatively broad, there may be the advantage in avoiding the peak timing of display noise more completely. As may be seen in FIG. 18, when the masking period is set relatively broad (masking period: 1.2 us), harmonic components increase, compared to when it is not (masking period: 0.8 us). Accordingly, it is necessary that the length of the masking period be set by taking into account the probability of the noise peak being included in the masking period and the sizes of the harmonic components of a transfer function.

Figure 19:
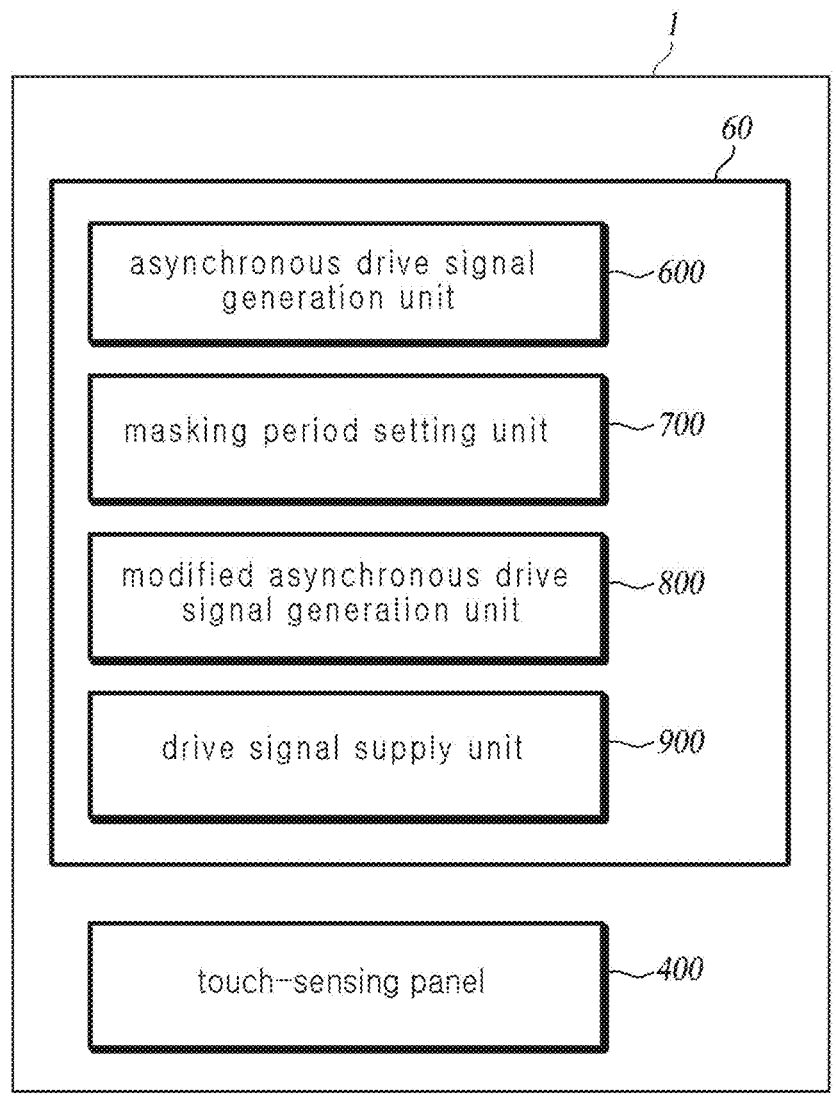
FIG. 19 is a block diagram of an electronic device including a noise avoiding device of a touch-sensing panel according to some example embodiments of the present inventive concepts.

FIG. 19 is a block diagram of an electronic device 1 including a noise avoiding device 60 of a touch-sensing panel 400 according to some example embodiments of the present inventive concepts.

According to some example embodiments, a noise avoiding device 60 of a touch-sensing panel 400 may include an asynchronous drive signal generation unit 600, a masking period setting unit 700, and/or a modified asynchronous drive signal generation unit 800. According to some example embodiments, a noise avoiding device 60 of a touch-sensing panel 400 may further include a drive signal supply unit 900.

The asynchronous drive signal generation unit 600 generates a sensing drive signal having a frequency different from a frequency of a display drive signal. The masking period setting unit 700 may set a masking period such that the masking period includes, among display noise generating intervals, an interval suspect of containing a noise peak. When a transition time, at which a state of the sensing drive signal transitions, is included within the masking period, the modified asynchronous drive signal generation unit 800 may generate a modified sensing drive signal which is modified such that the transition time is not included in the masking period.

In the noise avoiding device 60 of a touch-sensing panel 400 according to some example embodiments, functions performed by the asynchronous drive signal generation unit 600, the masking period setting unit 700, the modified asynchronous drive signal generation unit 800, and/or the drive signal transfer unit 900, respectively may correspond to the operations S600 to S900 in some example embodiments illustrated in FIG. 13, relating to the noise avoiding method in a touch-sensing panel 400.

As described above, a detailed description of a noise avoiding device 60 of a touch-sensing panel 400 according to some example embodiments of the present inventive concepts may be better understood by referring to the description of a noise avoiding method in a touch-sensing panel 400 previously provided in the detailed description with reference to FIG. 13 to FIG. 18, and in order to avoid repetitive description, the noise avoiding device 60 of a touch-sensing panel 400 according to some example embodiments of the present inventive concepts will not be described herein.

According to some example embodiments of the present inventive concepts, the noise avoiding device 60 and method for a touch-sensing panel 400 may compensate for signal drifts in each channel Y0 to Y4 of the touch-sensing panel 400 by taking into account that display noise may influence differently on each channel Y0 to Y4.

According to some example embodiments of the present inventive concepts, the noise avoiding device 60 and method for a touch-sensing panel 400, while applying a touch sensing drive signal having a frequency different from a display noise generating frequency, may avoid a noise peak area of display noise by modifying a waveform of the touch-sensing drive signal.

The terms "unit", that is, "module," "table," and the like as used herein, mean, but are not limited to, a software or hardware component such as a circuit, field programmable gate array (FPGA) or application specific integrated circuit (ASIC), and a module performs certain tasks. However, a module is not limited to a software or hardware component. A module may advantageously be configured to reside on addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may be implemented to execute on one or more CPUs inside a device.

While the present inventive concepts have been particularly shown and described with reference to specific example embodiments, it should be understood by those skilled in the art that various changes in form and detail may be made therein without departing from the spirit and scope of the present inventive concepts as defined by the appended claims. The above detailed description is not to be taken in a limiting sense, and the scope of the present inventive concepts is defined only by the appended claims, appropriately interpreted, along with the full range of equivalents to which the appended claims are entitled.

What is claimed is:

1. A noise compensation device for a touch-sensing panel, comprising:
   a noise compensation signal generator configured to generate mutually different noise compensation signals for at least portions of the first to Nth channels included in the touch-sensing panel; and
   a noise cancelling signal output circuit configured to,
   generate noise-compensated reception signals by comparing the mutually different noise compensation signals with reception signals of the touch-sensing panel via a plurality of comparators, and
   provide the noise-compensated reception signals to each of at least two channels among the first to Nth channels, wherein N is an integer two or greater.

2. The noise compensation device of claim 1, wherein the noise compensation signal generator includes first to Nth sub-noise compensation signal generators configured to generate the noise compensation signals for each of the first to Nth channels, and
   the first to Nth sub-noise compensation signal generators are configured to combine data signals with a common noise signal to generate the mutually different noise compensation signals.

3. The noise compensation device of claim 2, wherein each of the noise compensation signals includes a reset period and an amplification period, and
   the first to Nth sub-noise compensation signal generators are further configured to,
   receive and store the data signals during the reset period, and
   receive the common noise signal and combine the common noise signal with the data signals to generate the noise compensation signals, during the amplification period.

4. The noise compensation device of claim 3, wherein the noise cancelling signal output circuit includes first to Nth sub-noise cancelling signal output circuits configured to,
   compare the noise compensation signals to the reception signals of the touch-sensing panel during the amplification period,
   generate the noise-compensated reception signals based on the noise compensation signals, and
   output the noise-compensated reception signals to the first to Nth channels, wherein each of the first to Nth sub-noise cancelling signal output circuits includes a comparator.

5. The noise compensation device of claim 2, wherein the first to Nth sub-noise compensation signal generators are further configured to,
   generate adjusted common noise signals having different magnitudes by adjusting a magnitude of the common noise signal, and
   generate the mutually different noise compensation signals by combining the adjusted common noise signals with the data signals.

6. The noise compensation device of claim 2, wherein the touch-sensing panel includes first to Mth transmitting channels,
   the noise compensation signal generator is further configured to receive the common noise signal through any one of the first to Mth transmitting channels that do not transmit signals for a time period, wherein M is an integer two or greater.

7. The noise compensation device of claim 6, further comprising:
   a common noise signal buffering circuit configured to equalize the common noise signal to a uniform magnitude, and
   provide the common noise signal to the noise compensation signal generator.

8. The noise compensation device of claim 2, wherein, the first to Nth sub-noise compensation signal generators further include a variable capacitor, and the first to Nth sub-noise compensation signal generators are further configured to determine a magnitude of the common noise signal combined with the data signals by adjusting a capacitance value of the variable capacitor.

9. A noise compensation method of a touch-sensing panel, comprising:
generating mutually different noise compensation signals for at least portions of first to Nth channels included in the touch-sensing panel;
generating noise-compensated reception signals by comparing the mutually different noise compensation signals with reception signals of the touch-sensing panel via a plurality of comparators; and
providing the noise-compensated reception signals to at least two channels among the first to Nth channels, wherein N is an integer two or greater.

10. The noise compensation method of claim 9, wherein the generating the mutually different noise compensation signals includes combining data signals with a common noise signal to generate the mutually different noise compensation signals.

11. The noise compensation method of claim 10, wherein the noise compensation signals include a reset period and an amplification period, and
the combining the data signals with the common noise signal includes,
receiving the data signals and storing the data signals during the reset period, and
receiving the common noise signal and combining the common noise signal with the data signals to generate the noise compensation signals, during the amplification period.

12. The noise compensation method of claim 11, wherein the generating the noise-compensated reception signals includes,
comparing the noise compensation signals to the reception signals of the touch-sensing panel, and
outputting the noise-compensated reception signals, during the amplification period.

13. The noise compensation method of claim 10, wherein the combining the data signals with the common noise signal include,
adjusting a magnitude of the common noise signal to generate adjusted common noise signals having different magnitudes, and
combining the adjusted common noise signals having different magnitudes with the data signals to generate the mutually different noise compensation signals.

14. The noise compensation method of claim 13, further comprising:
transmitting the common noise signal through any one of first to Mth transmitting channels before the combining the data signals with the common noise signal, wherein the first to Mth transmitting channels are configured to not transmit signals for a time period, and
M is an integer two or greater.

15. The noise compensation method of claim 13, further comprising:
transmitting the common noise signal through any one of first to Mth transmitting channels; and
equalizing the common noise signal to a uniform magnitude, before the combining the data signals with the common noise signal and after the transmitting the common noise signal.

* * * * *